Figure 1:
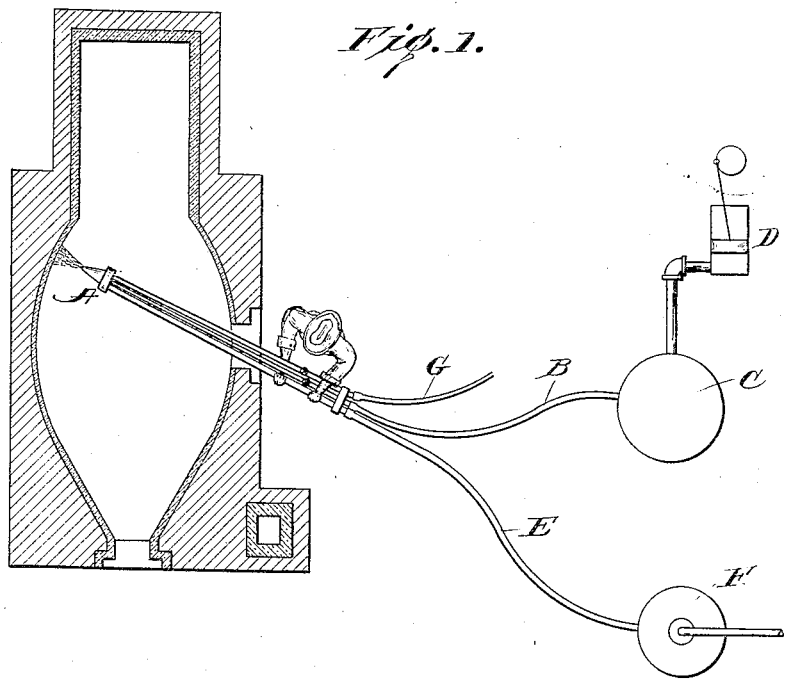

A. SCHWARZ.
PROCESS OF FORMING AND REPAIRING THE LININGS OF FURNACES.
APPLICATION FILED MAR. 3, 1913.

1,125,741.

Patented Jan. 19, 1915.

UNITED STATES PATENT OFFICE.

ALFRED SCHWARZ, OF NEW YORK, N. Y., ASSIGNOR TO NEW YORK CEMENT GUN COMPANY, OF NEW YORK, N. Y., A CORPORATION OF NEW YORK.

PROCESS OF FORMING AND REPAIRING THE LININGS OF FURNACES.

1,125,741. Specification of Letters Patent. Patented Jan. 19, 1915.

Application filed March 3, 1913. Serial No. 751,808.

*To all whom it may concern:*

Be it known that I, ALFRED SCHWARZ, a subject of the Emperor of Germany, residing at New York, in the county and State of New York, have invented certain new and useful Improvements in Processes of Forming and Repairing the Linings of Furnaces, of which the following is a full, clear, and exact description.

Furnaces which are subject to relatively high temperature, such as those for melting, smelting or refining metals, the manufacture of glass or the like, or those heated by electricity, or furnaces for boilers and the like, have heretofore been constructed with linings composed of fire-brick aggregates of silica or magnesite sand and the like, cemented together by binders such for example, as fire-clay or hydro-carbons such as coal tar and similar substances. The fusion point of the fire-clays thus used as a binder is very much lower than that of the refractory substances constituting the body of the lining, and its presence reduces the value of the refractory material in direct proportion to the quantity employed, as it renders the furnace and its lining subject to the disintegrating action of high temperature and a consequent gradual deterioration of the same. Repairs of such furnaces, effected by the use of refractory substances composed of mixtures of refractory sands with a binding material such as fire-clay, and water, are for the same reasons subject to similar deterioration. These difficulties are not obviated by the use of hydro-carbons as binders since the latter contain a large proportion of volatile constituents which, being driven off by heat, leave the lining in a more or less porous condition as only a comparatively small amount of solid carbon remains. It is well known, moreover, that a high degree of density in the lining is desirable in order that the contents of the furnace, such as molten metals, may not find their way into the body of the lining, since such substances will result in a deterioration of the lining which is in direct proportion to the square of the surface exposed to the corrosive action of the molten charge. Naturally, in the case of a porous lining the surface thus exposed is much greater than in a homogeneous mass. In the construction of furnaces, therefore, it becomes of primary importance, in order to produce a homogeneous or uniformly refractory lining of great density, to eliminate such binders as have heretofore been employed, or to minimize their quantity to such extent that their presence will not materially lower the fusing point of the finished structure nor diminish its density. But under the methods now followed or known in the art, this is not feasible.

In the manufacture of refractory bricks the requisite density may be secured by subjecting the aggregates of which the bricks are composed, to hydraulic or other pressure in molds, but in the production or repair of furnace linings such processes are not available, while the use of substantial proportions of binding material in building up a lining of bricks or shapes of refractory material is essential. I have discovered, however, that a homogeneous lining of the requisite density may be produced by applying to the form or wall of a furnace, comminuted refractory material at high velocity continuously or successively in relatively small quantities, and at the same time subjecting said material as it is thus applied to fusing temperature, thus furnishing successive thin layers of refractory material in heated and softened state into which the refractory material which follows is embedded, and building up a lining homogeneous and vitrified throughout. If the entire lining were built up of the ultimate thickness required, before the fusing heat was applied, only the outer or exposed portions of the lining would be fused, leaving the under portions merely dried out and porous, and the non-homogeneous lining thus produced would crack and fall off. But by subjecting the comminuted material to fusing temperature as it is applied to the furnace form or wall, a refractory lining is produced which is vitreous, dense, and homogeneous throughout, thus producing effects, so far as density is concerned, like those of high pressures, and obviating entirely, or reducing to a minimum, the use of binders or adhesive agents such as would impair the heat resisting qualities of the finished structure.

In carrying out my invention, I may use any known means for projecting the comminuted material against an opposing surface at high velocities. In practice I prefer to use a form of injector with steam or compressed air as the propelling agent, and capable of blowing the sand or fine particles of material against the surface to be operated upon at velocities from eight to fifteen thousand feet per minute, but I may use lower velocities, good results being obtained with any velocity of projection in excess of three thousand feet per minute. Any known and suitable means for producing the requisite high temperature of the comminuted material as it is thus applied may be employed. I prefer to use for this purpose a high power flame near the nozzle of the injector which will instantly raise the temperature to fusing temperature at the point of application. In this way I may fuse refractories directly onto the walls, roofs and bottoms of furnaces under higher temperatures than those at which such furnaces are normally operated. Since the term "refractory" is only relative, and as all materials used in furnace construction are fusible, it will be understood that a furnace might be lined with material fusible at three thousand degrees which is fully capable of resisting if the furnace is normally operated at two thousand degrees. In such cases I project the refractory material against the furnace walls of the preferably hot furnace, using near the injector nozzle a high power flame which will instantly raise the temperature at the point of application, and partially fuse the furnace wall, so that the refractory particles projected from the injector nozzle against the wall will imbed themselves in the partially fused surface of the same, and, in their turn, become softened by the high power flame so that the following particles will imbed themselves therein, and so on. On withdrawing the flame, the material congeals sufficiently to withstand the normal lower temperature of the furnace. I have found in cases where, for instance, silica sand is used which is practically free from lime and other fluxes, that minute quantities of flux may be advantageously used, as it facilitates the partial fusion of the lining, and in such cases I may use a weak solution of calcium chlorid, or borax or the like.

Under my invention, the lining may be applied while the furnace is under construction, or while it is cooled off so that it is possible to enter the same. On the other hand, as hereinbefore indicated, the lining may be applied or repaired while the furnace is heated to a degree too high to permit entrance to it. In the latter case, I employ nozzles which are of such length as to permit the operator to stand outside the furnace and to reach it at any desired point in its interior.

My process obviously is applicable not only to the forming, but also to the repairing, of furnace linings. By the same process I can drive finely comminuted refractory material into crevices between bricks or blocks of refractory material and cause it to adhere to the latter either in such crevices or on exposed surfaces, whether on the side walls or roof of a furnace, and whether the same be hot or cold.

Figure 2:
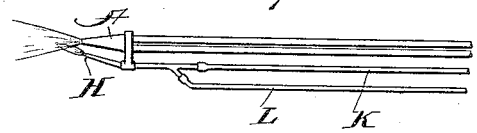

In the accompanying drawings, to which I shall now refer for a better understanding of my invention: Figure 1 shows a device or apparatus for projecting the comminuted refractory material forcibly against the wall of the furnace in accordance with my invention, a furnace being also shown in horizontal section in order to illustrate the manner of using the apparatus. Fig. 2 is a view of the nozzle of the apparatus of Fig. 1, associated with a torch H as the agent for maintaining the requisite softening or fusing temperature at the point of application of the comminuted refractory material to the form or wall of the furnace.

The devices in question, viz: the "cement gun" so called, and the torch, are at the present time well known and in use for other purposes, and as they, in themselves, form no part of my present invention, they are shown conventionally in forms which adapt them to carry out my process.

The implement shown in Fig. 1 comprises a nozzle A into which opens, in well known ways, a pipe or tube B leading from an air reservoir C in which air is compressed and stored by a suitable pump D, and a pipe E conveying in a finely divided state a suitable refractory material from a hopper or other feed device F. In case at any time it be desired to add a liquid to the comminuted refractory material, before it is discharged from the nozzle, a tube or pipe G is provided leading from a suitable source of liquid supply, which is not shown. The pipes for any desired distance back of the nozzle are rigid, so that the latter may be directed either from within or without the furnace to any portion of the walls thereof by the operator, and when in use a sufficiently powerful air pressure is used to take up the refractory material and project it from the nozzle violently or at high velocity upon the adjacent form or wall of the furnace. The requisite high softening or fusing heat at the point where the refractory material is applied to the furnace form or wall may be produced and maintained in any suitable way and by the employement of any suitable known instrumentalities. I prefer for this purpose the means illustrated in Fig. 2, comprising a torch H attached to the nozzle A in any convenient manner, and supplied through tubes K and L with acetylene and oxygen, or other gases capable of maintaining a persistent flame of intense heat, which, in the use of the device, is directed against the furnace wall within or near the area upon which the jet or refractory material impinges. These or other devices of known construction may be employed in the manner described, and the invention is in no respect limited to the special character of the apparatus or implements used.

What I claim is:

The process of forming or repairing the lining of a furnace which consists in projecting a refractory material in comminuted state at high velocity against the form or wall of a furnace and subjecting said wall to fusing temperature at the time and at the point of application only of said material.

In testimony whereof I affix my signature in the presence of two subscribing witnesses.

ALFRED SCHWARZ.

Witnesses:
 PHILIP S. HILL,
 THOMAS J. BYRNE.